US006676346B1

United States Patent
Frischmann et al.

(10) Patent No.: US 6,676,346 B1
(45) Date of Patent: Jan. 13, 2004

(54) METAL FASTENING ELEMENT

(75) Inventors: Albert Frischmann, Kenzingen (DE); Marc Schaeffer, Horb-Bildechingen (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/048,201
(22) PCT Filed: Jun. 17, 2000
(86) PCT No.: PCT/EP00/05601
§ 371 (c)(1),
(2), (4) Date: Apr. 29, 2002
(87) PCT Pub. No.: WO01/09525
PCT Pub. Date: Feb. 8, 2001

(30) Foreign Application Priority Data

Jul. 30, 1999 (DE) .......................................... 199 36 090

(51) Int. Cl.⁷ ................................................ F16B 13/04
(52) U.S. Cl. ........................ 411/32; 411/60.1; 411/57.1
(58) Field of Search ............................. 411/60.1, 60.2, 411/60.3, 57.1, 30, 31, 32, 63–68

(56) References Cited

U.S. PATENT DOCUMENTS

| 925,006 | A | * | 6/1909 | Mason | 411/25 |
| 4,806,053 | A | * | 2/1989 | Herb | 411/32 |
| 4,921,381 | A | * | 5/1990 | Gschwend et al. | 411/25 |
| 4,986,711 | A | * | 1/1991 | Fischer | 411/55 |
| 5,211,512 | A | * | 5/1993 | Frischmann et al. | 405/259.4 |
| 5,419,664 | A | * | 5/1995 | Hengesbach et al. | 411/61 |
| 5,634,750 | A | * | 6/1997 | Frischmann et al. | 411/33 |

FOREIGN PATENT DOCUMENTS

DE          37 14 025 A           11/1988

* cited by examiner

Primary Examiner—Flemming Saether
Assistant Examiner—Jori Schiffman
(74) Attorney, Agent, or Firm—Michael J. Striker

(57) ABSTRACT

The invention relates to a fastening element made from metal, having an expansion sleeve (2) and an expansion member (3), which expansion member (3) is axially displaceable on the shank of a threaded bolt (8), the threaded bolt (8) having on its forward end an end-stop in the form of an expander (9). On the threaded bolt (8), between the expander (9) and the expansion member (3), there is arranged a spacing element (10). In the event of a tensile load, the expander (9) enters the spacing element (10) and forms a deformation zone that corresponds to the length of the spacing element (10). As a result of the friction and deformation occurring in the deformation zone, overloads are absorbed and, consequently, the fastening element is prevented from coming out or the threaded bolt from breaking off.

4 Claims, 1 Drawing Sheet

METAL FASTENING ELEMENT

The invention relates to a fastening element made from metal, for anchoring in a hole drilled in a building component, according to the preamble of claim 1.

DE 37 14 025 C2 discloses a fastening element of the same generic type having an expansion sleeve and an expansion member, the latter being axially displaceable on the shank of a threaded bolt. The threaded bolt has, at its forward end, an end-stop, which is in the form of a collar, and a helical spring, which is arranged between the end-stop and the axially displaceable expansion member. When a nut bearing against an article being fastened is screwed up on the threaded bolt, the latter is moved in the direction of the mouth of the drilled hole and, in the process, by means of the helical spring arranged between the end-stop and the displaceable expansion member, the expansion member is pressed into the expansion sleeve for anchoring of the latter in the hole drilled in the building component. At the same time, the helical spring is biased slightly so that, if the drilled hole widens as a result of crack formation, the expansion member is subjected to further pressing in order to compensate for the widening of the drilled hole. The known fastening element is, moreover, also capable of absorbing shock loads occurring, for example, as a result of an earthquake and consequently is capable of preventing the fastening element from coming out or the threaded bolt from breaking off.

In the case of the known solution it is, however, disadvantageous that, under certain circumstances, the further pressing of the expansion member into the expansion sleeve causes such an increase in the axial spacing between the expansion member and the end-stop that, afterwards, the helical spring is no longer biased and, under certain circumstances, even exhibits axial play. Because the expansion member is no longer braced and biased, further pressing of the expansion member is no longer possible in the event of further widening of the drilled hole resulting from enlargement of the crack, for example as a result of aftershocks.

The invention is accordingly based on the problem of providing a fastening element that is capable of absorbing a succession of shock loads without failure of the anchoring.

The solution to the problem is achieved by means of the features set but in claim 1.

As a result of using a sleeve-shaped spacing element, instead of a helical spring, and an end-stop in the form of an expander, the expander is, in the event of an overload acting on the threaded bolt, drawn into the spacing sleeve. As a result of the large amount of friction that is then caused on widening out and deformation of the spacing element, the spacing element is pressed against the expansion member, which is axially displaceable on the threaded bolt and which is consequently pushed further into the expansion sleeve. Because no restoring force is produced by the spacing element, the reduced spacing between the expander and the expansion member caused by the overload and, as a result, the biasing of the expansion member in the expansion sleeve are still present even after the loading has eased. In the event of further shock loads occurring, the expander is merely displaced inside the spacing element further towards the expansion member, the biasing pressure on the expansion member still being present by virtue of the friction inside the spacing element. The length of the spacing element consequently determines the length of the deformation zone, it being possible for the pull-through force to be adjusted by means of various parameters. It is, for example, possible for the spacing element to be in the form of a closed sleeve made from a soft metal or plastics material.

A preferred form of the spacing element is a spring sleeve having a longitudinal slit, the widening out of which spring sleeve is performed by the expander in the resilient region. It is advantageous for the expander to be in the form of a cone having a cylindrical collar adjacent thereto.

The fastening element according to the invention can be in the form of an undercut anchor, in which case the expansion sleeve is anchored in an undercut in the drilled hole, or in the form of a push-through anchor, in which case the shank of the threaded bolt, next to the region accommodating the expansion sleeve, widens out to the diameter of the expansion sleeve.

Exemplary embodiments of the invention are shown in the drawing, in which.

Figure 1:
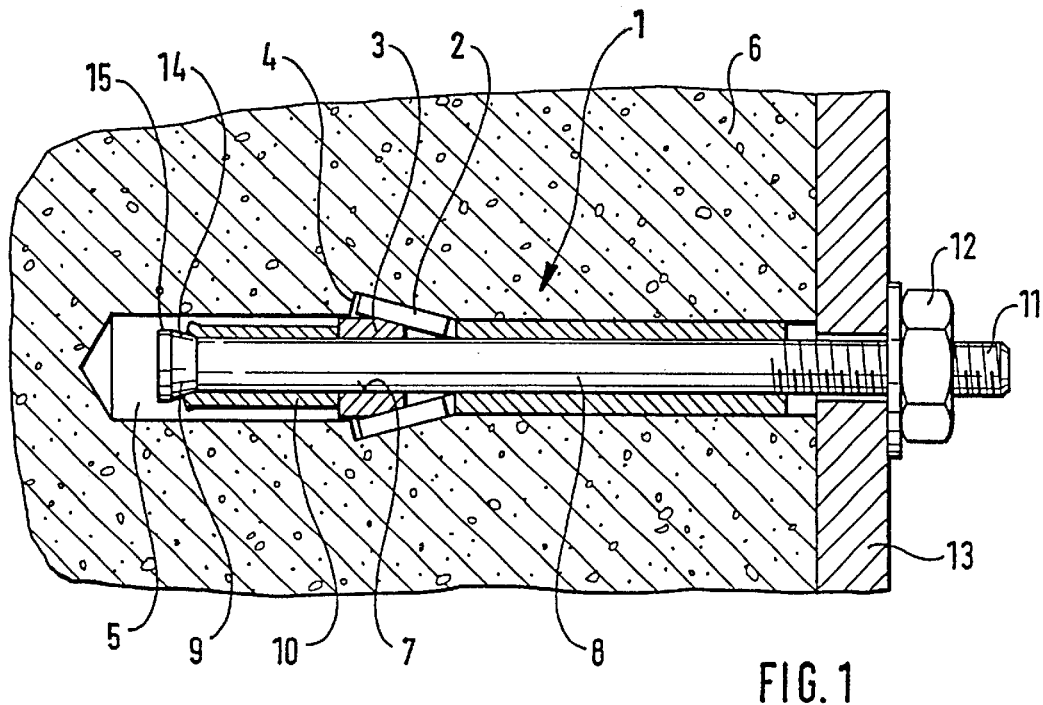
FIG. 1 shows the fastening element according to the invention in an embodiment as an undercut anchor.

The fastening element 1 shown in FIG. 1 has an expansion sleeve 2, which by means of the expansion member 3 is anchored in a hole 5, which is drilled in a building component 6 and provided with an undercut 4. The expansion member 3, which has a through-hole 7, is axially displaceable on the shank of the threaded bolt 8.

Between the expansion member 3 and the expander 9, which is arranged at the forward end of the threaded bolt 8, there is arranged a sleeve-shaped spacing element, which can, for example, be made from a soft metal or from a plastics material in the form of a closed sleeve. In this instance, plastic deformation of the sleeve occurs when the expander 9 is drawn through the spacing element 10. When the spacing element 10 is in the form of a spring sleeve having a longitudinal slit, resilient deformation is brought about on drawing through the expander 9, the frictional force being determined by the wall thickness of the spring sleeve. The threaded bolt passing through the spacing element 10, the expansion member 3 and the expansion sleeve 2 has, at its rear end, a thread 11, onto which a nut 12 is screwed for fastening an article 13. When the nut 12 is screwed up, the threaded bolt 8 is moved axially towards the mouth of the drilled hole so that the expander 9 entering the spacing element 10 gives rise to a pushing force on the expansion member 3. That pushing force presses the expansion member 3 into the slit portion of the expansion sleeve 2 and expands the expansion sleeve 2 in the undercut 4, resulting in a positive connection between the fastening element 1 and the building component 6.

If the threaded bolt 8 is then subjected to shock loads, the expander 9 is suddenly drawn further into the sleeve-shaped spacing element 10, generating a damped pushing force that acts on the expansion member 3. As a result of the friction and deformation of the spacing element, overloading of both the threaded bolt and the concrete is avoided. The deformation zone can be matched to the prevailing installation circumstances by means of the length of the spacing element 10 and the material and geometry of the expander and spacing element. In the exemplary embodiment shown, the expander 9 is formed by a cone 14 having a cylindrical collar 15 adjacent thereto.

Figure 2:
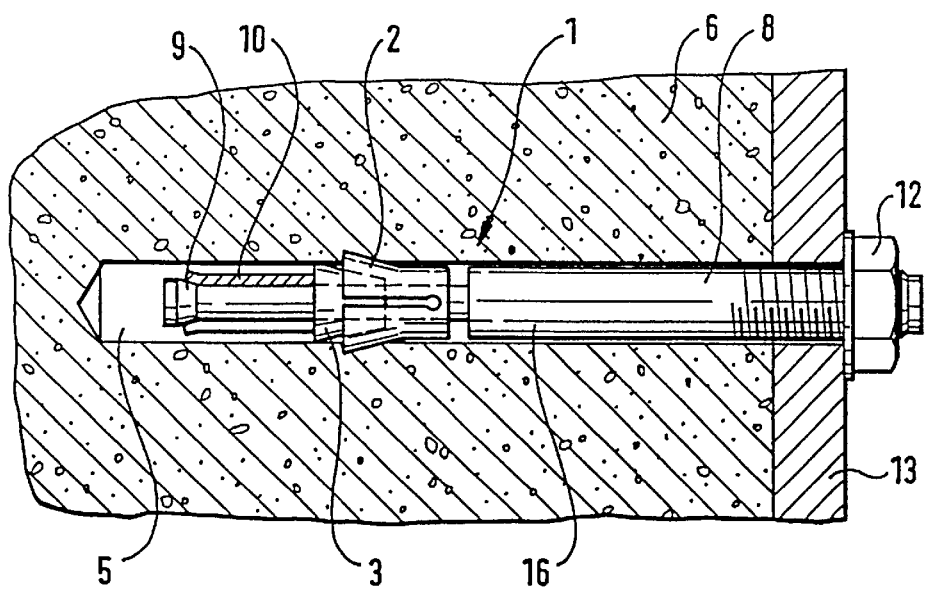
FIG. 2 shows the fastening element in an embodiment as a push-through anchor.

In the exemplary embodiment shown in FIG. 2, the shank 16 of the threaded bolt 8, next to the region accommodating the expansion sleeve 2, has been widened out to the diameter of the expansion sleeve 2. As a result, such a fastening element 1a can be used in push-through mounting, in which case the fastening element can be inserted into the drilled hole 5 through the article 13 being fastened. In this exemplary embodiment, the spacing element 10 is in the form of a spring sleeve and the anchoring occurs in a cylindrical drilled hole 5.

What is claimed is:

1. Fastening element made from metal, comprising an expansion sleeve and an expansion member, wherein the expansion member has a smooth inner bore and is axially displaceable on a shank of a threaded bolt, for anchoring the threaded bolt in a hole drilled In a building component, the threaded bolt having an end-stop on a forward end, wherein a sleeve-shaped spacing element is arranged between the end-stop and the expansion member, wherein said spacing elements bears against the expansion member, wherein the end-stop is in the form of an expander, wherein in the event of a tensile load, the expander enters the spacing element and forms a deformation zone that corresponds to a length of the spacing element.

2. Fastening element according to claim 1, wherein the spacing element is a spring sleeve having a longitudinal slit.

3. Fastening element according to claim 1, wherein the expander is formed by a cone having a cylindrical collar adjacent thereto.

4. Fastening element according to claim 1, wherein the shank of the threaded bolt, next to a region accommodating the expansion sleeve, widens out to a diameter of the expansion sleeve.

* * * * *